United States Patent

[11] 3,588,645

[72] Inventor Thomas P. Gilmore
    Wauwatosa, Wis.
[21] Appl. No. 743,873
[22] Filed July 10, 1968
[45] Patented June 28, 1971
[73] Assignee Allis-Chalmers Manufacturing Co.
    Milwaukee, Wis.

[54] SYSTEM FOR CONTROLLING MAGNITUDE AND PHASE OF TERMINAL VOLTAGE FOR ADJUSTABLE SPEED SYNCHRONOUS MOTOR
    22 Claims, 8 Drawing Figs.
[52] U.S. Cl. ............................................. 318/142,
    318/146, 318/148, 318/176, 318/178
[51] Int. Cl. ................................................ H02p 5/24
[50] Field of Search ............................................. 318/142,
    143, 145, 146, 148, 175, 176, 177, 178, 179

[56] References Cited
    UNITED STATES PATENTS
    3,350,612 10/1967 Hansen et al. ............ 318/146X
    3,427,471 2/1969 South ..................... 318/179X Primary Examiner—Oris L. Rader
Assistant Examiner—H. Huberfeld
Attorneys—Lee H. Kaiser, Thomas F. Kirby and Robert B. Benson ABSTRACT: A system for generating a control signal for an adjustable speed synchronous motor which is a replica of the desired terminal voltage to be applied to the motor in frequency, magnitude and phase. It includes tachometer means for deriving a speed signal which is a function of motor speed, means responsive to the speed signal for generating first and second alternating signals in accordance with the rectangular coordinates of a curve whose variable parameter is motor speed and whose polar coordinates are desired magnitude and phase angle of motor terminal voltage, and rotary inductor, vector adder means which converts the alternating signals into an output signal whose magnitude is the vector sum and whose phase angle is the tangent of the quotient of the alternating signals. The output signal may control a frequency changer which energizes the synchronous motor.

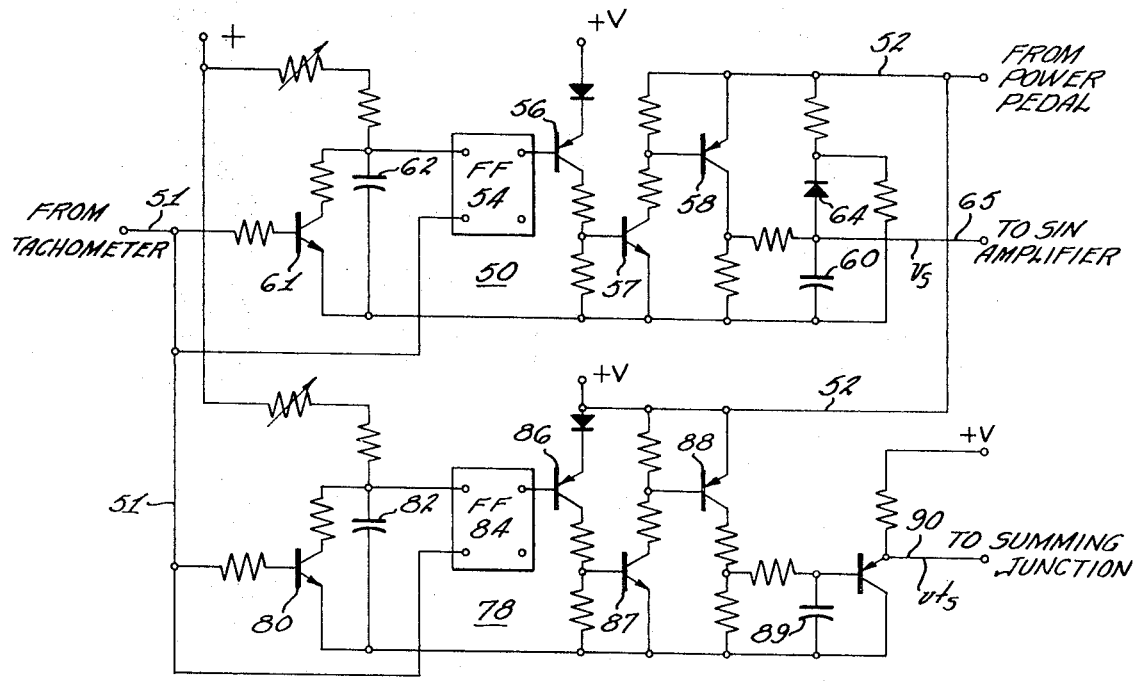
Fig. 7
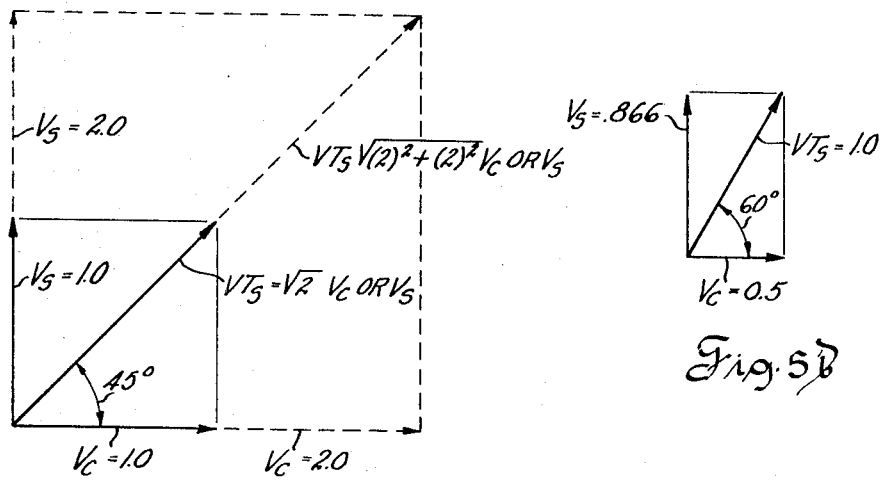
Fig. 5a
Fig. 5b

SYSTEM FOR CONTROLLING MAGNITUDE AND PHASE OF TERMINAL VOLTAGE FOR ADJUSTABLE SPEED SYNCHRONOUS MOTOR

This invention relates to control systems for electrical motors and in particular to a system for generating a control signal for an electrical motor which is a replica of the desired terminal voltage to be applied to said motor in frequency, magnitude and phase.

Synchronous motors are ideally suited for constant speed application because motor speed is proportional to the frequency of the power applied to the stator winding, and the power line frequency is usually fixed. For adjustable speed applications, usually DC motors are used with shunt field rheostats or wound rotor induction motors with secondary speed control are utilized. Synchronous motors are not inherently suited for adjustable speed systems because the average torque at standstill is practically zero, the rotor must reach nearly synchronous speed for the field poles on the rotor to lock with the poles of the revolving stator field, and the rotor must remain in synchronism at all times with the rotating field generated by the stator winding. If the torque required by the load exceeds the pullout value, the synchronous motor will drop out of synchronism, the average torque becomes zero, and the motor comes to rest.

It is an object of the invention to provide a system for generating a control signal for a synchronous motor which permits adjustment of the speed of the motor over a wide range.

A patent application entitled Vehicle Electric Motor Drive System, Ser. No. 824,223, filed May 13, 1969, 1968, in the names of William L. Ringland, Manfred E. Neumann, Ernst K. Kaeser, Thomas P. Gilmore and Allois F. Geiersbach and having the same assignee as this invention, discloses an adjustable speed synchronous motor system having selectively variable power output levels and which provides substantially constant output power over a wide speed range for each power level and which incorporates the system of the present invention to derive the signal for controlling the synchronous motor.

When a synchronous motor of a constant frequency system is running in synchronism under load, the rotor poles generated by the field winding lag the stator poles by an angle called the load angle, or displacement angle. The displacement angle is between the impressed terminal voltage and the countervoltage, or excitation voltage and varies with fluctuation in torque load in a constant frequency system. The displacement angle DT between impressed voltage VT and the countervoltage ED is caused by the synchronous impedance drop Ia Zs and is shown in FIG. 1 which is a vector diagram for the system of application Ser. No. 824,223 for rated load at the base speed at the lower limit of the speed range. In an adjustable speed synchronous motor system, the displacement angle DT varies from zero at standstill to approximately ninety degrees as shown in FIG. 2 which graphically represents the variation of motor terminal voltage magnitude VT and phase angle DT with motor speed in the system of application Ser. No. 824,223, to obtain constant power over the speed range.

In order to keep the rotor poles in an adjustable speed synchronous motor system locked in with the rotating stator poles, the frequency of the terminal voltage impressed on the stator winding must at all times be in synchronism with rotor speed, and further the terminal voltage must be advanced in phase at all motor speeds by the displacement angle between the magnetic flux produced by the field current acting above and the magnetic flux corresponding to the terminal voltage. Further, the magnitude of the terminal voltage impressed on the stator winding must be controlled as a function of motor speed.

The synchronous motor characteristic that speed is proportional to frequency of the source permits use of speed sensing means such as a tachometer driven by the motor to directly control a frequency changer which supplies the variable frequency terminal voltage to the stator winding in an adjustable speed synchronous motor system. It is also necessary, as described above, that the phase angle and the magnitude of the impressed terminal voltage be controlled at all times as a function of motor speed.

It is a further object of the invention to provide a system for an adjustable speed synchronous motor which generates a control signal for a frequency changer which energizes the motor whose frequency is a function of the speed of the motor and whose phase angle and magnitude are also functions of the speed of the motor. Another object is to provide such a control system which varies the magnitude of the terminal voltage impressed on the motor as a function of both the speed of the motor and the desired power output from the motor.

The variation in magnitude and phase angle of the terminal voltage to be applied to the stator winding in an adjustable speed synchronous motor system can be expressed graphically by means of loci of an equation in which motor speed is the variable parameter and the magnitude and phase angle are the radius vector and vectorial angle polar coordinates of the curve formed by the loci. FIG. 3 illustrates such a curve for the adjustable speed synchronous motor drive system of the aforementioned application Ser. No. 824,223. The full line graph designated "reduced power" in FIG. 3 is the curve for one power output level from the synchronous motor, and the dotted line graph designated "rated power" is another such curve plotting the loci of terminal voltage magnitude and phase angle when the synchronous motor is delivering rated power. The magnitude of the terminal voltage to be applied to the motor stator winding as a function of motor speed is the radius vector of the curve, two vectors VT1 and VT2 for the reduced power curve being shown in FIG. 3. The displacement angle by which the terminal voltage VT is to be advanced in phase relative to the rotor poles is the vectorial angle DT of the curve, two vectorial angles DT1 and DT2 for the reduced power curve being shown in FIG. 1. It will be noted that the magnitude of the terminal voltage VT in the system of Ser. No. 824,223, is maintained constant from the base speed F=1.0 at the lower limit of the speed range (shown by the vector VT1 having the phase angle DT1) with increase in motor speed while the displacement angle increases from approximately 40° at speed F=1.0 to approximately 90° at speed F=approximately 3.5, at which the terminal voltage is shown by the radius vector VT2 and the displacement angle of the terminal voltage by the vectorial angle DT2.

It is still another object of the invention to provide a system for generating a signal for controlling an adjustable speed synchronous motor whose magnitude and phase angle are the polar coordinates of a curve which graphically expresses variation of displacement angle and desired variation of magnitude of motor terminal voltage as functions of motor speed.

The curves shown in FIG. 3 plotting the relationship between terminal voltage magnitude and phase angle can also be defined by the rectangular coordinates $x$ and $y$ which vary as a function of motor speed F, or by the parametric equations of the curve having motor speed F as the variable parameter. Separate function generating means can be utilized which are responsive to the output signal from a tachometer driven by the motor to derive signals in accordance with the $x$ and $y$ rectangular coordinates of the curve shown in FIG. 3, or in accordance with the parametric equations of such curve. However, independent derivation of signals proportional to the $x$ and $y$ rectangular coordinates is difficult to achieve with any degree of accuracy and requires extremely complicated electronic circuitry.

It is a general object of the invention to provide an improved system for generating an output signal whose magnitude and phase are polar coordinates of a curve which graphically represents two quantities that vary as a function of a third, or variable parameter.

It is a specific object of the invention to provide an improved system for generating an output signal for controlling an adjustable speed synchronous motor whose magnitude and phase are polar coordinates of a curve graphically representing variation of motor terminal voltage magnitude and displacement angle as a function of motor speed and which system is simpler than one having independent function generating means responsive to the variable motor speed parameter for deriving separate signals in accordance with the $x$ and $y$ coordinates of the curve.

These and other objects and advantages of the invention will be more readily understood from the following detailed description when considered in conjunction with the accompanying drawings wherein:

FIGS. 5a and 5b are schematic diagrams illustrating vector addition of two signals which vary as a function of the rectangular coordinates $x$ and $y$ of a curve to derive an output signal whose magnitude and phase are polar coordinates of the curve;

FIG. 7 is a schematic circuit diagram of the function generating means of the system of FIG. 6 which are responsive to both motor speed and to the desired power output level.

Figure 6:
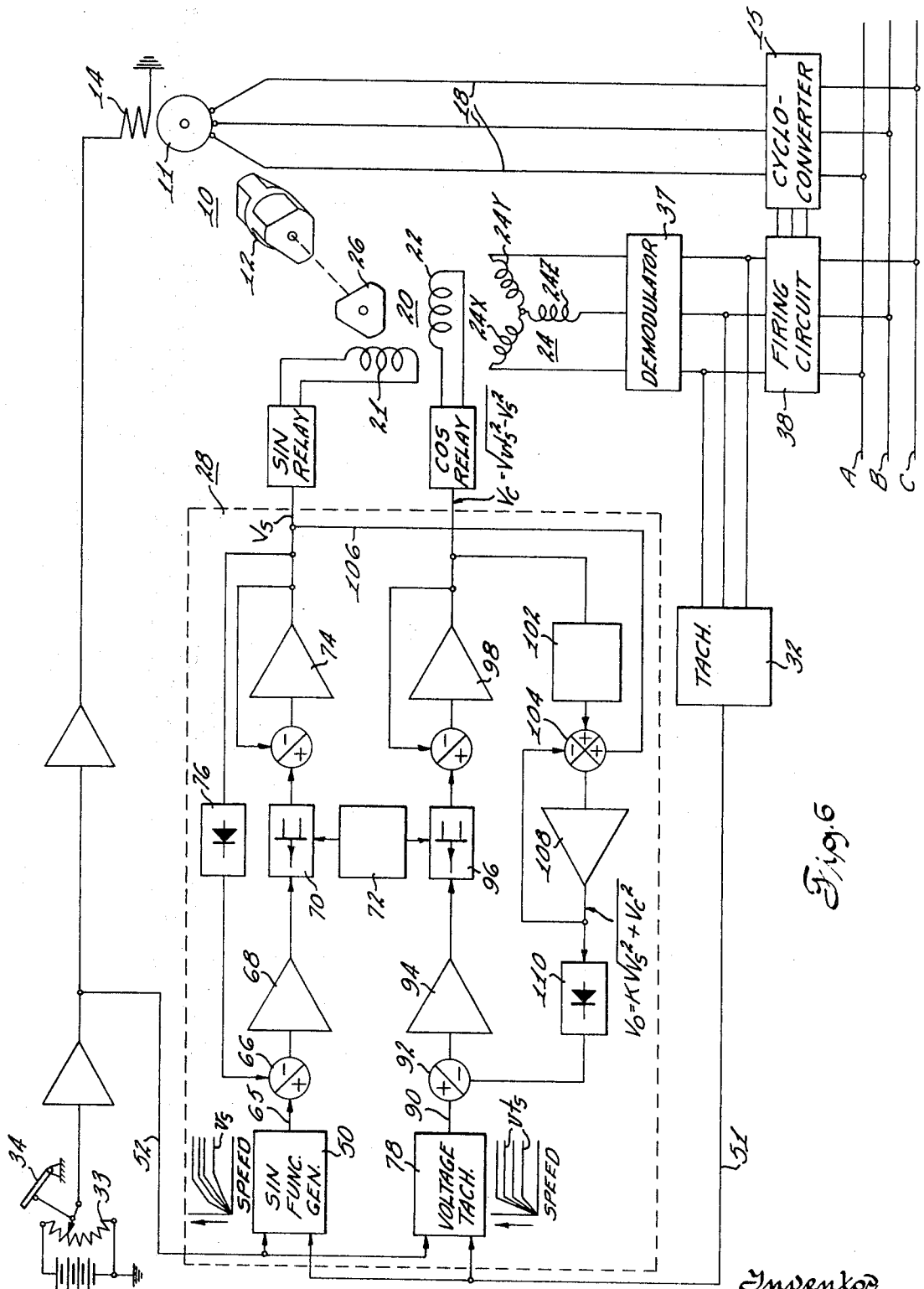
FIG. 6 is a block diagram of an adjustable speed synchronous motor system embodying the invention.

Referring to FIG. 6 of the drawing, an adjustable speed synchronous motor system such as disclosed in application Ser. No. 824,223, embodying the present invention includes a synchronous three phase motor 10 which preferably is of the inductor type, although any synchronous motor having adjustable field excitation, including a conventional salient pole type may be used. Motor 10 preferably has a three phase armature winding or stator winding 11, a solid ferromagnetic rotor 12, and a field winding, or exciting winding 14 on the motor stator (not shown) for generating magnetic poles in rotor 12. A frequency changer, or cycloconverter 15 is supplied with constant voltage, high frequency power from three phase busses A, B and C from a suitable power source such as a generator (not shown) and converts this high and constant frequency power to a lower, variable frequency terminal voltage VT supplied over conductors 18 to the stator winding 11.

Figure 2:
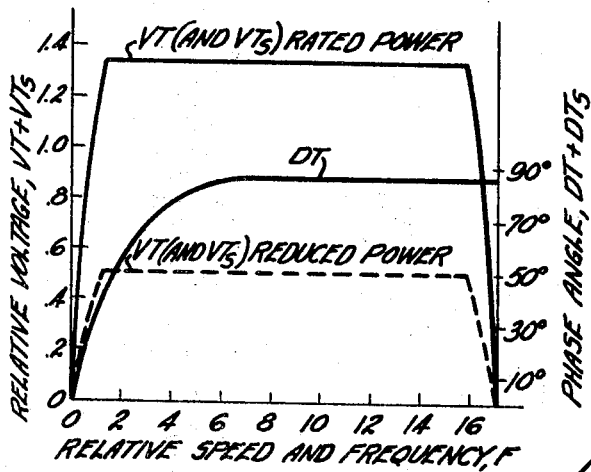
FIG. 2 is a graph plotting variation of motor terminal voltage and displacement angle versus motor speed in the adjustable speed synchronous motor system of application Ser. No. 824,223.
Figure 1:
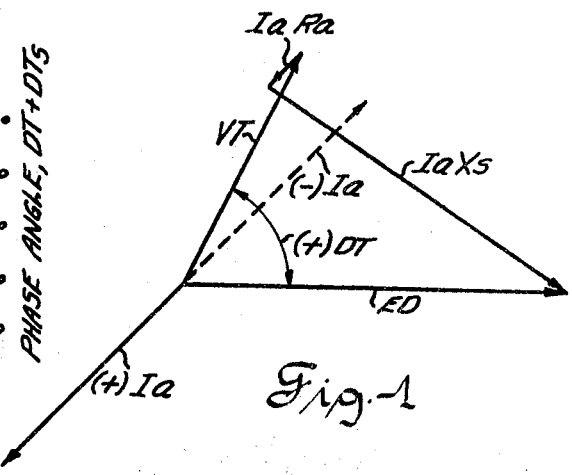
FIG. 1 is a vector diagram for an adjustable speed synchronous motor illustrating the displacement angle between the terminal voltage impressed on the stator winding and the countervoltage at the base speed at the lower limit of the speed range.

The system of the invention derives an output signal for controlling cycloconverter 15 (which supplies the terminal voltage VT impressed upon armature winding 11) whose frequency is in synchronism with the speed of rotor 12, whose phase is advanced as a function of motor speed by the displacement angle DT between motor terminal voltage and the countervoltage as shown in FIG. 2, and whose magnitude is a function of both: (1) motor speed for a desired power output level as shown in FIG. 2 and (2) the desired power output from the motor 10. As explained hereinbefore, the frequency of the terminal voltage VT applied to stator winding 11 must be in synchronism with the rotor 12 and the terminal voltage must be advanced by the displacement angle $\overline{DT}$ between the terminal voltage and countervoltage to assure that the magnetic poles generated in the rotor 12 by field winding 14 lock in with the rotating stator poles, and thus maximum torque is provided by motor 10.

A resolver, or rotary inductor, vector adder 20, sometimes termed an angle sensor, has two angularly displaced primary energizing winding 21 and 22, preferably in quadrature, termed "sine" and "cosine" windings respectively, a secondary, or output winding 24 comprising three phase windings 24X, 24Y, and 24Z displaced 120 electrical degrees apart and inductively linked to the energizing windings 21 and 22, and a ferromagnetic rotor 26 driven by motor rotor 10 and adapted to sinusoidally vary the inductive coupling between the output winding 24 and the primary windings 21 and 22 as it rotates. A preferred form of rotary inductor, vector adder 20 has a laminated stator (not shown) on which both the primary and secondary windings are mounted and is disclosed in the copending application of Ernest K. Kaeser et al. Ser. No. 824,176, filed May 13, 1969, entitled "Rotary Inductor" and having the same assignee as the present invention. The vector adder of said application Ser. No. 824,176, has a laminated stator with radial teeth (not shown) encircled by coils of both the primary and secondary windings, and the ferromagnetic rotor varies the permeance of the magnetic flux paths through the teeth to modulate the inductive coupling between primary and secondary windings as it rotates.

Figure 4:
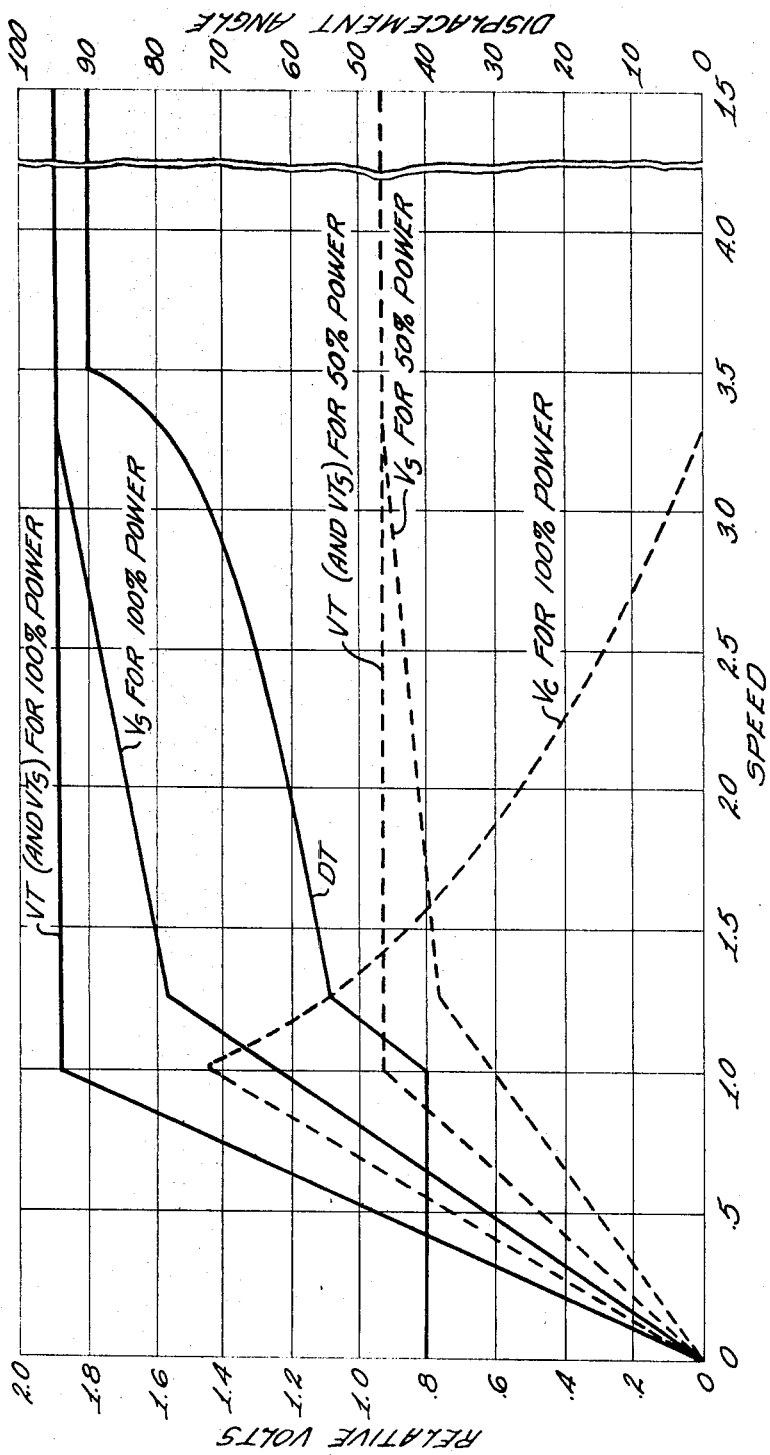
FIG. 4 is a graph plotting variation of motor terminal voltage magnitude and displacement angle, and also the rectangular coordinates of the curve graphically representing these quantities, as a function of motor speed in the system of said application Ser. No. 824,223.

The system of the invention, when embodied in adjustable speed synchronous motor apparatus, derives output signals $VT_s$ in secondary windings 24X, 24Y and 24Z which control cycloconverter 15 and whose magnitude and phase angle vary with motor speed in the manner shown in FIGS. 2 and 4 for each power output level selected. The angle sensor output signal $VT_s$ is a replica of and proportional to the desired motor terminal voltage VT to be generated by cycloconverter 15 (assuming no voltage drop in cycloconverter 15) and is represented by the same curve in FIGS. 2 and 4 designated "VT (and $VT_s$)."

Figure 3:
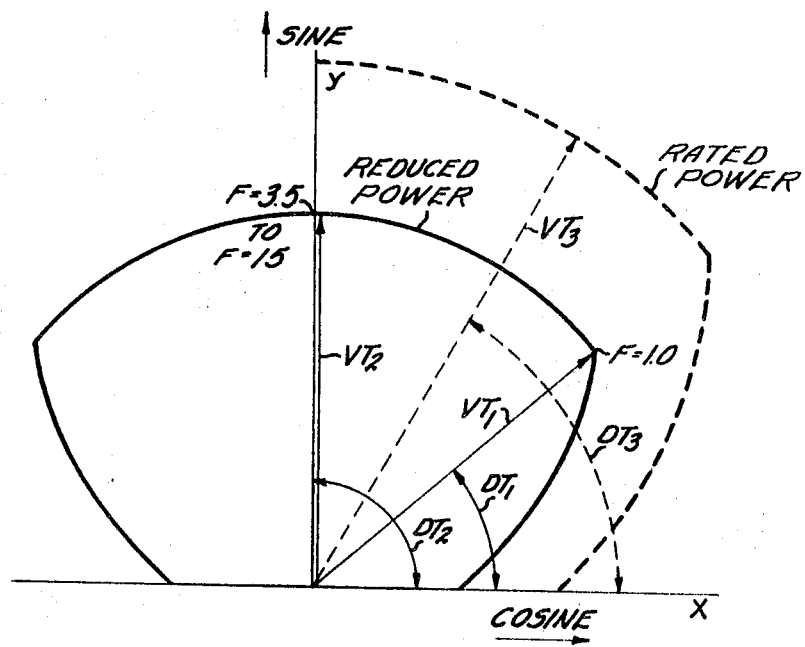
FIG. 3 is a curve plotting variation of motor terminal voltage magnitude and displacement angle as polar coordinates in the adjustable speed synchronous motor system of the aforementioned application Ser. No. 824,223, embodying the invention.

The curve of FIG. 3 graphically represents the desired variation of motor terminal voltage magnitude and displacement angle with motor speed wherein the magnitude VT is the radius vector polar coordinate and the displacement angle DT is the vectorial angle polar coordinate of the curve. This same curve also represents the desired variation of angle sensor output voltage signal $VT_s$ in magnitude and displacement angle. The system of the invention, when embodied in an adjustable speed synchronous motor control, regulates the magnitude of the sine and cosine signals $V_s$ and $V_c$ to windings 21 and 22 in accordance with the rectangular coordinates $y$ and $x$ of the curve of FIG. 3, or stated in another manner, in accordance with the parametric equations of the curve of FIG. 3 whose variable parameter is motor speed. The abscissae and ordinates of FIG. 3 are shown as the magnitude of the signals $V_c$ and $V_s$ to the cosine and sine primary windings 22 and 21. FIG. 4 illustrates the manner in which the angle sensor control 28 regulates the magnitude of the sine and cosine signals $V_s$ and $V_c$ to primary winding 21 and 22 in accordance with the rectangular coordinates of the curve of FIG. 3 to derive output signals $VT_s$ in angle sensor secondary windings 24X, 24Y and 24Z which vary in magnitude and displacement angle as a function of motor speed as shown in FIG. 2. In other words, angle sensor control 28 regulates the magnitude of the sine and cosine signals $V_s$ and $V_c$ as function of the $y$ and $x$ rectangular coordinates of the curve of FIG. 3 (and in accordance with the parametric equations of this curve), and the angle sensor output signals $VT_s$ control cycloconverter 15 which impresses a terminal voltage or stator winding 11 in accordance with the characteristic designated VT advanced by the displacement angle DT shown in FIGS. 2 and 4.

Cycloconverter 15 is shown only in block form and preferably includes a positive group of three silicon controlled rectifiers (not shown) associated with each of the three motor stator phase windings and conductors 18 to carry positive current from the three phase power busses A, B and C and a negative group of three silicon controlled rectifiers associated with each of the three motor stator phase windings and the conductors 18 to carry negative current from the busses A, B and C.

The primary sine and cosine windings 21 and 22 are separately excited with sine and cosine alternating, in-phase signals $V_s$ and $V_c$ from control 28 which independently regulates the magnitude of the signals $V_s$ and $V_c$ in accordance with the rectangular coordinates y and x of the curve of FIG. 3 whose polar coordinates are motor terminal voltage magnitude VT and displacement angle DT as shown in FIG. 2. When motor 10 is at standstill and the angle sensor control 28 energizes the sine and cosine windings 20 and 21 with fixed magnitude, in-phase alternating signals, the 90 degree displaced sine and cosine windings 21 and 22 generate magnetic fields of constant magnetic intensity which inductively link the three-phase secondary windings 24X, 24Y and 24Z and induce fixed magnitude signals therein. The permeances, or reluctances of the paths for the magnetic flux generated by the sine and cosine windings 21 and 22 and the voltage level of the fixed amplitude signals induced in the three-phase secondary windings 24X, 24Y and 24Z is a function of the position of angle sensor rotor 26. When motor 10 rotates, the angle sensor output voltages induced in secondary windings 24X, 24Y and 24Z are no longer fixed in amplitude but rather have a sinusoidal modulation at a frequency which is a function of the speed of the motor 10. The envelopes of the three angle sensor output signals induced in the secondary phase windings 24X, 24Y and 24Z are displaced 120° (electrical) because of the physical location of these windings on the angle sensor stator.

The angle sensor control 28 receives a "power" signal from the movable contact of a potentiometer 33 which is actuated by a foot-operated power pedal 34. A suitable DC power source such as a battery may be connected across potentiometer 33, and the magnitude of the power signal is a function of the position of power pedal 34 and independently controls the signals $V_s$ and $V_c$ to windings 21 and 22 as a function of this power signal, thereby controlling the ampere turns of these windings and the magnitude of the signals $VT_s$ induced in secondary phase windings 24X, 24Y and 24Z which control cycloconverter 15. The effect of change in position of power pedal 34 is to derive another curve having the same shape as the curves designated "reduced power" and "rated power" in FIG. 3; to change the length of the radius vector polar coordinate VT while maintaining the same phase angle DT; to proportionally change the x and y coordinates; to proportionally change the magnitude of the alternating signals $V_s$ and $V_c$ shown in FIG. 4; and to proportionally change the magnitude of the signals $VT_s$ induced in angle sensor output winding 24 and the terminal voltage VT applied to motor stator winding 11 as shown in FIGS. 2 and 4 without varying the displacement angle DT. Angle sensor control 28 regulates the magnitude of the signals $V_s$ and $V_c$ to the energizing windings 21 and 22 to control the magnitude of the terminal voltage VT applied to motor stator winding 11 as a function of position of power pedal 34, and thus vary the power output from motor 10 as a function of power pedal position.

Angle sensor control 28 also receives a "speed" signal from a tachometer 32 which is a function of the speed of motor 10 and modifies the signals $V_s$ and $V_c$ to the angle sensor energizing windings 21 and 22 in accordance with the y and x coordinates (and in accordance with the parametric equations) of the curve of FIG. 3 in which motor speed is the variable parameter. Tachometer 32 may be of conventional construction, but preferably it is of the type disclosed in the aforementioned application Ser. No. 824,223 which detects zero crossing of the phase output voltages from angle sensor secondary windings 24X, 24Y, and 24Z and also detects when such phase voltages cross each other and delivers a pulse at each such crossing so that 36 pulses are generated per revolution of motor rotor 12 at a frequency which is a function of motor speed. Angle sensor control 28 preferably modifies the voltages $V_s$ and $V_c$ to sine and cosine windings 21 and 22 as a function of motor speed in the manner shown in FIG. 4 so that the angle sensor output voltages $VT_s$ induced in secondary windings 24X, 24Y and 24Z vary linearly as shown in FIGS. 2 and 4 from zero at zero speed to full value (corresponding to a given position of power pedal 34) at the base frequency F=1.0 and remain at full value from F=1.0 to maximum motor speed at F=15.0. Above base speed F=1.0, angle sensor control 28 unequally varies the magnitude of the signals $V_s$ and $V_c$ to the windings 21 and 22 in opposite directions (See FIG. 4) as a function of motor speed while maintaining the magnitude of the angle sensor output voltage $VT_s$ constant (as shown by the radius vector VT in FIG. 3) for a desired power output level, thereby unequally varying the ampere turns of windings 21 and 22 and shifting the phase of the modulation of the output voltages $VT_s$ induced in secondary winding 24X, 24Y and 24Z relative to the angular position of angle sensor rotor 26 and relative to the magnetic poles generated in motor rotor 12 by field winding 14, while maintaining the magnitude of these voltages $VT_s$ constant. The output signals $VT_s$ from angle sensor secondary windings 24X, 24Y and 24Z control cycloconverter 15, and angle sensor control 28 thus regulates the displacement angle DT of the voltage VT applied to motor stator winding 11 relative to the magnetic poles on motor rotor 12 as a function of motor speed while maintaining the magnitude of the terminal voltage VT constant for a given position of power pedal 34 by independently varying the magnitude of the sine and cosine signals to sine and cosine windings 21 and 22 to obtain the terminal voltage versus speed and displacement angle versus speed characteristics designated VT and DT shown in FIGS. 2 and 4.

Assuming that equal alternating in-phase signals $V_s$ and $V_c$ are applied to the sine and cosine windings 21 and 22, these instantaneous voltages may be schematically represented by the perpendicular vectors $V_s$ and $V_c$ shown in FIG. 5a. Change in magnetic of signals to windings 21 and 22 varies the ampere turns of these windings and thus may be considered to vary the length of the vectors $V_s$ and $V_c$. The output signal induced in secondary winding 24 by equal magnitude signals $V_s=1.0$ and $V_c=1.0$ may be represented by the resultant vector $VT_s$ having a magnitude equal to $\sqrt{2}$ times $V_c$ and $V_s$ and shifted 45° from both. The angle sensor output voltage $VT_s$ is proportional in phase and magnitude to the desired output voltage VT from cycloconverter 15 applied to motor stator winding 11. FIG. 5a may thus represent the condition shown at speed F=1.1 in FIG. 4 where, for full power pedal, $V_c$ and $V_s$ are equal and have a magnitude of approximately 1.35 (relative) volts; the angle sensor output voltage $VT_s$ has a magnitude of 2 times 1.35 equals 1.9 (relative) volts and is displaced by an angle DT equals 45° from the magnetic poles generated on motor rotor 12 by field winding 14; and the motor terminal voltage VT is proportional in magnitude to the angle sensor output signal $VT_s$ and is shifted by the angle DT.

If the cosine winding 22 only is energized, the resultant voltage $VT_s$ induced in secondary winding 24 is proportional to and in phase with the cosine signal $V_c$. If the sine winding 21 only is energized and the cosine signal $V_c$ is zero, the resultant voltage $VT_s$ is proportional to and in phase with the sine signal $V_s$, and this represents a condition above speed F=3.5 in FIG. 4 wherein the displacement angle DT of the angle sensor output voltage $VT_s$ (and the corresponding displacement angle between the terminal voltage VT applied to stator winding 11 and the magnetic poles generated in motor rotor 12 by exciting winding 14) is approximately 90°.

FIG. 5b illustrates that the resultant voltage $VT_s$ induced in angle sensor output winding 24 may be shifted through an angle of 60° by energizing the sine winding 21 to a relative magnitude of 0.866 and the cosine winding 22 to a relative magnitude of 0.5. The resultant vector $VT_s$ has a magnitude equal to $\sqrt{(.5)^2 + (.866)^2} = 1.0$ and is displaced 60 degrees from the vector $V_c$.

The dotted line vectors in FIG. 5a represent the condition wherein the signals $V_s$ and $V_c$ to the sine and cosine windings 21 and 22 are doubled in magnitude compared to those shown by the full line vectors $V_c=1.0$ and $V_s=1.0$ and illustrate that the magnitude of the resultant signal $VT_s$ induced in secondary phase winding 24 can be increased, while maintaining the same displacement angle DT, by equally varying the signals $V_s$ and $V_c$. Such variation in magnitude of signals $V_s$ and $V_c$ can result from a change of motor speed or from change in position of power pedal 34.

Tachometer 32 generates a speed signal which is representative of the variable parameter (i.e., motor speed) of a curve shown in FIG. 3 (for a given position of power pedal 34) and angle sensor control 28 includes first function generating means responsive to the speed signal over conductor 51 for deriving an alternating signal $V_s$ in accordance with the $y$ rectangular coordinates of said curve and second function generating means responsive to the speed signal over conductor 51 for deriving an alternating signal $V_c$ in accordance with the $x$ rectangular coordinate of said curve. The first function generating means for deriving alternating signal $V_s$ includes a sine function generator 50 responsive to the speed signal over conductor 51 for deriving a DC signal designated $V_s$ in accordance with the $y$ rectangular coordinate of the curve of FIG. 3. Such direct current signal is proportional to the alternating signal $V_s$.

Sine function generator 50 also receives a "power" signal over conductor 52 which is a function of the position of power pedal 34. Sine function generator 50 derives a different DC voltage ($V_s$) versus speed characteristic (shown schematically in FIG. 6) for each position of power pedal 34, and such characteristic is of the same shape and may be represented by the alternating signal $V_s$ characteristic shown in FIG. 4.

Function generator 50 (See FIG. 7) receives pulses over conductor 51 from tachometer 32 at a frequency proportional to speed of motor 10 and by means of a flip-flop 54 which is set by the pulses and three transistors 56, 57, and 58 charges a capacitor 60 by the output pulses from the flip-flop 54 to a voltage proportional to motor speed in accordance with one parametric equation of a curve of FIG. 3. Function generator 50 includes a set reset flip-flop 54 that is set and a transistor 61 that is turned on to discharge a capacitor 62 in response to each pulse. After the pulse disappears and transistor 61 turns off, capacitor 62 is charged through a resistor from a DC voltage source until the voltage across it rises sufficiently to reset flip-flop 54. When flip-flop 54 is set, transistors 56, 57, and 58 turn on and apply the flip-flop output pulse to capacitor 60. The output pulses from flip-flop 54 are of constant width regardless of pulse frequency and are amplified by transistors 57 and 58 to a magnitude dependent upon the power signal on conductor 52 and charge capacitor 60 to a potential that varies linearly with the frequency of pulses from tachometer 32.

The input power signal over conductor 52 proportional to the position of power pedal 34 is normally blocked by a reverse biased diode 64. When the motor speed and the voltage across capacitor 60 becomes sufficiently high, diode 64 becomes forward biased, and the rate of rise of the voltage across capacitor 60 decreases, thereby generating the lower slope portion of the $V_s$ characteristic shown in FIG. 6 (and the portion of the alternating $V_s$ characteristic shown in FIG. 4 between F=1.2 and F=3.3). When motor speed is above F=3.3, the frequency of pulses from tachometer 32 is so high that flip-flop 54 is not reset after each pulse, diode 64 conducts continuously, and a constant potential exists across capacitor 60 whose magnitude is proportional to the position of foot pedal 34, thereby generating the horizontal portion of the DC signal $V_s$ characteristic.

The DC output signal from sine function generator 50 on conductor 65 flows successively through a summing junction 66 (See FIG. 6) and an operational amplifier 68 to a modulator 70 which also receives an input from an oscillator 72 whose frequency may be 10 kilocycles per second. Modulator 70 preferably is a field effect transistor utilized unbiased as a variable resistor and modulates the carrier frequency signal from oscillator 72 in accordance with the DC input signal $V_s$ from function generator 50. The output from modulator 70 is supplied to a feedback-controlled sine power amplifier 74 and through the contacts of a SIN relay to sine winding 21. A feedback circuit is provided through a rectifier 76 to summing junction 66 which compares the DC output signal $V_s$ from sine function generator 50 with the rectified alternating signal $V_s$ from sine power amplifier 74 to insure that the AC output of power amplifier 74 is proportional to the DC output signal $V_s$ from function generator 50. The feedback circuit through rectifier 76 to summing junction 66 is desirable to prevent errors in the closed loop including the feedback circuit from resulting in large variations in displacement angle DT.

The second function generating means for deriving an alternating signal $V_c$ in accordance with the $x$ rectangular coordinate of a curve of FIG. 3 does not directly generate signal $V_c$ (nor a DC signal proportional to $V_c$) in the preferred embodiment of the invention. Rather, a function generator 78, termed a voltage tachometer, is provided which derives a DC voltage $VT_s$ that varies as a function of motor speed in accordance with the radius vector polar coordinate VT of a curve shown in FIG. 3, and thus in accordance with the desired angle sensor output signal designated $VT_s$ in FIGS. 2 and 4. Another way of stating this is that voltage tachometer 78 generates a DC signal which varies with motor speed as a function of $\sqrt{V_s^2 + V_c^2}$.

The DC output signal $VT_s$ from voltage tachometer 78 is proportional to, but differs in magnitude from, both the angle sensor alternating output voltage $VT_s$ and the corresponding motor terminal voltage VT, and all three voltages may be represented by the same characteristic in FIG. 4.

Angle sensor control 28 vectorially subtracts the sine signal $V_s$ from the output signal $VT_s$ from voltage tachometer 78 (which is proportional to $\sqrt{V_s^2 + V_c^2}$) to derive the alternating signal $V_c$ applied to cosine winding 22.

Voltage tachometer 78 generates a different direct current signal $VT_s$ for each power pedal position whose magnitude is proportional to the radius vector polar coordinate of the curve shown in FIG. 3 for such power pedal position, and thus voltage tachometer 78 generates the family of DC signal $VT_s$ versus speed characteristics shown in FIG. 6 whose magnitude is proportional to the required input signal $VT_s$ to cycloconverter 15 which will provide the desired motor terminal voltage VT shown in FIG. 2.

Voltage tachometer 78 shown in FIGS. 6 and 7 receives a "power" signal on conductor 52 which is a function of the position of power pedal 34 and also receives a "speed" signal over conductor 51 which is a function of motor speed and modifies the power signal so the DC output voltage $VT_s$ from voltage tachometer 78 varies linearly from zero at zero frequency to full value at speed F=1.0 and remains at full value from F=1.0 to maximum motor speed. Each pulse over conductor 51 from tachometer 32 turns on a transistor 80 to discharge a capacitor 82 and also sets a set-reset flip-flop 84 that provides constant width output pulses regardless of frequency. After the pulse disappears, the capacitor 82 is charged through a resistance until the voltage across it rises sufficiently to reset flip-flop 84. Each output pulse from flip-flop 84 turns on transistors 86, 87, and 88 to transfer the pulse to a storage capacitor 89. The "power" signal on conductor 52 forward biases the emitter of transistor 88 and thus controls the magnitude of the pulses which charge storage capacitor 89. When the pulses from tachometer 32 reach a predetermined frequency corresponding to speed F=1.0, flip-flop 84 is not reset by the charge on capacitor 82 after each pulse disappears, and the output signal from voltage tachometer 78 on conductor 90 is the constant magnitude voltage on capacitor 89 which constitutes the horizontal portion of the $VT_s$ versus speed characteristics and whose magnitude is a function of position of foot pedal 34. Each of the $VT_s$ versus speed characteristics schematically shown in FIG. 6 is associated with a different position of power pedal 34 and thus represents a different output power level from motor 10.

The direct current output signal $VT_s$ from function generator 78 is supplied over conductor 90 to a summing junction 92 where it is compared to rectified DC voltage $V_o$ corresponding to the vector sum of the alternating voltages $V_s$ and $V_c$ on the sine and cosine windings 21 and 22. The difference signal from summing junction 92 is the DC signal derived by the second function generating means proportional to the $x$ rectangular coordinate of the curve of FIG. 3 and is coupled through an operational amplifier 94 to a modulator 96, which preferably is a field effect transistor used unbiased as a variable resistor, and receives a carrier frequency signal from oscillator 72 and modulates it in accordance with the DC output signal from operational amplifier 94. The alternating signal from modulator 96 is amplified in a cosine power amplifier 98, and the alternating output signal $V_c$ from power amplifier 98 is coupled through the contacts of a COS relay to cosine winding 22. The alternating signal $V_c$ is also fed back to summing junction 92 through phase shifting means 102 which shifts the phase of the alternating $V_c$ voltage applied to cosine winding 22 through 90° to provide the required right angle relationship between $V_s$ and $V_c$. The summing junction 104 vectorially adds the alternating output signal $V_c$ from phase shifting means 102 with the alternating sine signal $V_s$ on conductor 106 connected to the output of sine power amplifier 74. The difference output signal $V_o$ from summing junction 104 is proportional to $\sqrt{V_s^2+V_c^2}$ and is coupled through a feedback controlled amplifier 108 and a rectifier 110 to summing junction 92 which vectorially subtracts the rectified signal $V_o$ from the signal $VT_s$ to derive the DC signal in accordance with the $x$ rectangular coordinate of the curve of FIG. 3, and thus generate the alternating cosine signal $V_c=\sqrt{v_{t}^2-V_s^2}$ that is supplied to cosine winding 22. It will be appreciated that the disclosed circuit provides a closed loop in which the DC signal $v_{ts}$ from voltage tachometer 78 is directly proportional to the vector sum of the alternating signals $V_s$ and $V_c$ applied to the sine and cosine windings. Thus, for a programmed input to voltage tachometer 78, the excitation of cosine winding 22 is forced to assume a value $V_c$ such that, when added vectorially to the excitation $V_s$ of sine winding 21, an output signal $VT_s$, shown in FIG. 4, will be derived from angle sensor secondary winding 24 which is in accordance with the radius vector polar coordinate of the curve of FIG. 3 and will result in the desired magnitude and phase of terminal voltage VT on motor stator winding 11 which will assure that the magnetic poles generated in motor rotor 12 are locked in with the stator winding poles over the speed range.

FIG. 4 illustrates the signals $V_s$ and $V_c$ generated by angle sensor control 28 and the resulting signal $VT_s$ from angle sensor 20 for 100 percent power, i.e., for a power signal corresponding to the position of power pedal 36 calling for maximum power. The signals $V_s$, $V_c$ and $VT_s$ appear at the sine winding 21, the cosine winding 22 and at the angle sensor output winding 24 respectively.

Over the speed range from zero to speed equals approximately 1.0, the alternating sine signal $V_s$, the output signal $VT_s$ from angle sensor 20 applied to cycloconverter 15, and the motor terminal voltage VT preferably increase linearly with motor speed so that the displacement angle DT (which is equal to the tangent of the angle between $V_c$ and $V_s$) shown in FIG. 4 remains constant at approximately 40°.

Above speed F=1.0, angle sensor control 28 preferably regulates angle sensor 20 to generate a constant magnitude output signal $VT_s$ (which controls cycloconverter 15) as shown in FIGS. 2 and 4 by unequally varying the magnitudes of signals $V_c$ and $V_s$ in opposite directions as a function of motor speed to obtain the required displacement angle DT. It will be noted from FIG. 4 that the cosine signal $V_c$ preferably starts to decrease at speed F=1.0, that sine signal $V_s$ continues to increase above this speed, that the output signal $Vt_s$ from angle sensor 20 is constant in magnitude above this speed, and that the displacement angle DT continues to increase to a maximum value of 90° at approximately speed F=3.5. Above this speed the magnitude of sine signal $V_s$ is constant and the cosine signal $V_c$ is zero. It will be recalled that a different curve of the shape shown in FIG. 3 graphically expresses the relation between magnitude and phase angle for each position of power pedal 34 and further that cosine signal $V_c$ is derived by vectorially subtracting sine signal $V_s$ from voltage tachometer output signal $VT_s$ which is proportional to angle sensor output signal $VT_s$, whereby $V_c$ is forced to diminish when $VT_s$ remains constant above speed F=1.0 and $V_s$ increases in magnitude above this speed.

The three-phase output voltages $VT_s$ from angle sensor secondary windings 24X, 24Y and 24Z are demodulated in a ring type discriminator 37 to remove the carrier signal. Discriminator 37 provides three-phase output voltages of motor frequency controlled in magnitude and phase angle relative to a reference axis or the motor rotor, i.e., the axis of internal motor voltage ED shown in the vector diagram of FIG. 2. Firing circuit 38 combines the three-phase, high frequency output signals from busses A, B and C with the three-phase low frequency angle sensor output voltages $VT_s$ and firing circuit 60 includes level detectors which sense the zero crossing points of such resulting composite signals and generate the gating signals for the controlled rectifiers of the cycloconverter 15 as disclosed in application Ser. No. 824,223.

While only a single motor control embodiment of the invention has been illustrated and described, it will be appreciated that the invention has many other applications wherein it is desired to control voltage magnitude and phase and further that many modifications and variations of the invention will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

I claim:

1. A system for generating an alternating output signal whose magnitude and phase are polar coordinates of a curve having a variable parameter comprising, in combination:
   means for generating a first control signal which is representative of said variable parameter;
   first function generating means responsive to said first control signal for deriving a first alternating signal in accordance with one of the rectangular coordinates of said curve; and
   second function generating means responsive to said first control signal for deriving a second alternating signal in accordance with the other rectangular coordinate of said curve; and
   rotary inductor, vector adder means having first and second energizing windings in quadrature coupled to said first and second function generating means respectively and an output winding inductively linked to said energizing windings for converting said first and second alternating signals into an alternating output signal induced in said output winding whose magnitude is the vector sum and whose phase angle is the tangent of the quotient of said first and second alternating signals, said vector adder means including rotor means for cyclically modulating the inductive coupling between said energizing and output windings as it rotates.

2. A system in accordance with claim 1 wherein said second function generating means includes means responsive to said first control signal for deriving a third signal which is a function of the radius vector polar coordinate of said curve:
   means for deriving a fourth signal which is a function of the vector sum of said first and second alternating signals, and means for comparing said third and fourth signals, whereby the output from said comparing means is representative of said other rectangular coordinate.

3. A system in accordance with claim 1 wherein said first function generating means includes means responsive to said first control signal for deriving a first DC signal in accordance with said one rectangular coordinate of said curve:
   means for generating a carrier signal, and
   a first modulator coupled to said carrier signal generating means and to said first DC signal deriving means for varying the magnitude of said carrier signal in accordance with said DC signal.

4. A system in accordance with claim 3 wherein said second function generating means includes means responsive to said first control signal for deriving a second DC signal which is a function of the radius vector polar coordinate of said curve:

means for vectorially adding said first and second alternating signals to produce a resultant signal;

means for rectifying said resultant signal;

means for comparing said second DC signal with the output signal from said rectifying means to derive a difference signal; and a second modulator coupled to said carrier signal generating means and to said comparing means for varying said carrier signal in accordance with said difference signal, whereby the output signal from said second modulator is representative of said other rectangular coordinate.

5. A system in accordance with claim 4 wherein said means for vectorially adding includes means for shifting the phase of one of said alternating signals 90°, and means for summing the output signal from said phase shifting means and the other alternating signal.

6. A system in accordance with claim 3 and also including means for rectifying said first alternating signal, and means for comparing said first DC signal and the output signal from said rectifying means, the output signal from said comparing means being the input to said first modulator.

7. A system in accordance with claim 4 wherein said first and second modulators are field effect transistors and said first DC signal and said difference signal are coupled to the gates of said field effect transistors.

8. A system in accordance with claim 1 for generating a variable alternating output signal whose instantaneous magnitude and phase are polar coordinates of a one of plurality of similarly shaped curves all of which have the same variable parameter and said parameter has a coefficient, and including means for generating a second control signal which is representative of said coefficient, said first and second function generating means also being responsive to said second control signal.

9. A system for deriving a variable magnitude and variable phase angle alternating output signal for controlling an adjustable speed electric motor comprising, in combination:

tachometer means for deriving a speed signal which is a function of the speed of said motor;

first function generating means responsive to said speed signal for deriving a first alternating signal in accordance with one parametric equation of a curve whose variable parameter is the speed of said motor and whose polar coordinates are the desired magnitude and the desired phase angle of terminal voltage to be applied to said motor;

second function generating means responsive to said speed signal for deriving a second alternating signal in accordance with the other parametric equation of said curve; and rotary inductor vector adder means having angularly displaced first and second energizing windings coupled to said first and second function generating means respectively and an output winding inductively linked to said energizing winding for converting said first and second alternating signals into an alternating output signal induced in said output winding whose magnitude is the vector sum and whose phase angle is the tangent of the quotient of said first and second alternating signals, said vector adder means including rotor means driven by said motor for cyclically modulating the inductive coupling between said energizing and output windings.

10. A system in accordance with claim 9 wherein said first function generating means includes means responsive to said speed signal for deriving a first DC signal in accordance with said one parametric equation, means for generating a carrier signal, and a first modulator coupled to said carrier signal generating means and to said first DC signal deriving means for varying the magnitude of said carrier signal in accordance with said first DC signal.

11. A system in accordance with claim 9 and including means for deriving a power signal which is a function of the desired power output from said motor and wherein said first and second function generator means are also responsive to said power signal and vary said first and second alternating signals as a function of said power signal.

12. A system in accordance with claim 9 wherein said second function generating means includes means responsive to said speed signal for deriving a third signal which is a function of the radius vector polar coordinate of said curve, and means for deriving a fourth signal which is the vector sum of said first and second alternating signals, and means for comparing said third and fourth signals, whereby the output from said comparing means is representative of said other parametric equation.

13. A system in accordance with claim 10 wherein said second function generating means includes means responsive to said speed signal for deriving a second DC signal which is a function of the radius vector polar coordinate of said curve, means for vectorially adding said first and second alternating signals to produce a resultant signal, means for rectifying said resultant signal, means for comparing said second DC signal with the output signal from said rectifying means to derive a difference signal, and a second modulator coupled to said carrier signal generating means and to said comparing means for varying the magnitude of said carrier signal in accordance with said difference signal, whereby the output signal from said second modulator is representative of said other parametric equation.

14. A system in accordance with claim 13 wherein said means for vectorially adding includes means for shifting the phase of said second alternating signal 90 degrees, and means for adding the output signal from said phase shifting means and said first alternating signal.

15. A system in accordance with claim 14 and also including second rectifying means for rectifying said first alternating signal, and means for comparing said first DC signal and the output from said second rectifying means, the output signal from said comparing means being the input to said first modulator.

16. A system for generating an alternating output signal whose magnitude and phase are polar coordinates of a curve having a variable parameter and defined by first and second parametric equations comprising, in combination:

means for generating a first control signal which is a function of said variable parameter;

first and second function generating means responsive to said first control signal and including an oscillator and first and second modulators coupled to said oscillator for deriving first and second in-phase alternating signals in accordance with said first and second parametric equations respectively; and vector adder, rotary inductor means having angularly displaced first and second energizing windings coupled to said first and second modulators respectively and an output winding inductively coupled to said energizing windings for converting said first and second alternating signals into an alternating output signal induced in said output winding whose magnitude is the vector sum and whose phase angle is a function of the quotient of said first and second alternating signals, said vector adder rotary inductor means including rotor means for cyclically modulating the inductive coupling between said energizing and output windings as it rotates.

17. A system in accordance with claim 16 wherein said first function generating means includes means responsive to said first control signal for deriving a first DC signal in accordance with said first parametric equation and wherein said means for deriving a first DC signal is coupled to said first modulator and said first DC signal modulates the magnitude of the output signal from said oscillator in said first modulator.

18. A system in accordance with claim 17 wherein said second function generating means includes means responsive to said first control signal for deriving a second DC signal whose magnitude is a function of the radius vector polar coordinate of said curve:

means for vectorially adding said first and second alternating signals to derive a vector sum signal;

means for rectifying said vector sum signal; and first comparing means for comparing said second DC signal and the output signal from said rectifying means, the output signal from said first comparing means being the input to said second modulator, whereby the output signal from said second modulator is a function of said second parametric equation.

19. A system in accordance with claim 18 and also including means for selectively deriving a second control signal which is a function of the desired magnitude of said output signal, and wherein said first and second function generating means are also responsive to said second control signal to vary the magnitude of said first and second alternating signals.

20. A system in accordance with claim 19 wherein said means for vectorially adding includes means for shifting the phase of said second alternating signal 90° and means for summing the output signal from said phase shifting means and said first alternating signal.

21. A system in accordance with claim 20 and including second rectifying means for rectifying said first alternating signal, and second comparing means for comparing said first DC signal and the output signal from said second rectifying means and for supplying the difference signal as the input to said first modulator.

22. A system in accordance with claim 21 wherein said first and second modulators are field effect transistors and said first DC signal and said output signal from said first comparing means are coupled to the gates of said field effect transistors.